Figure 1:
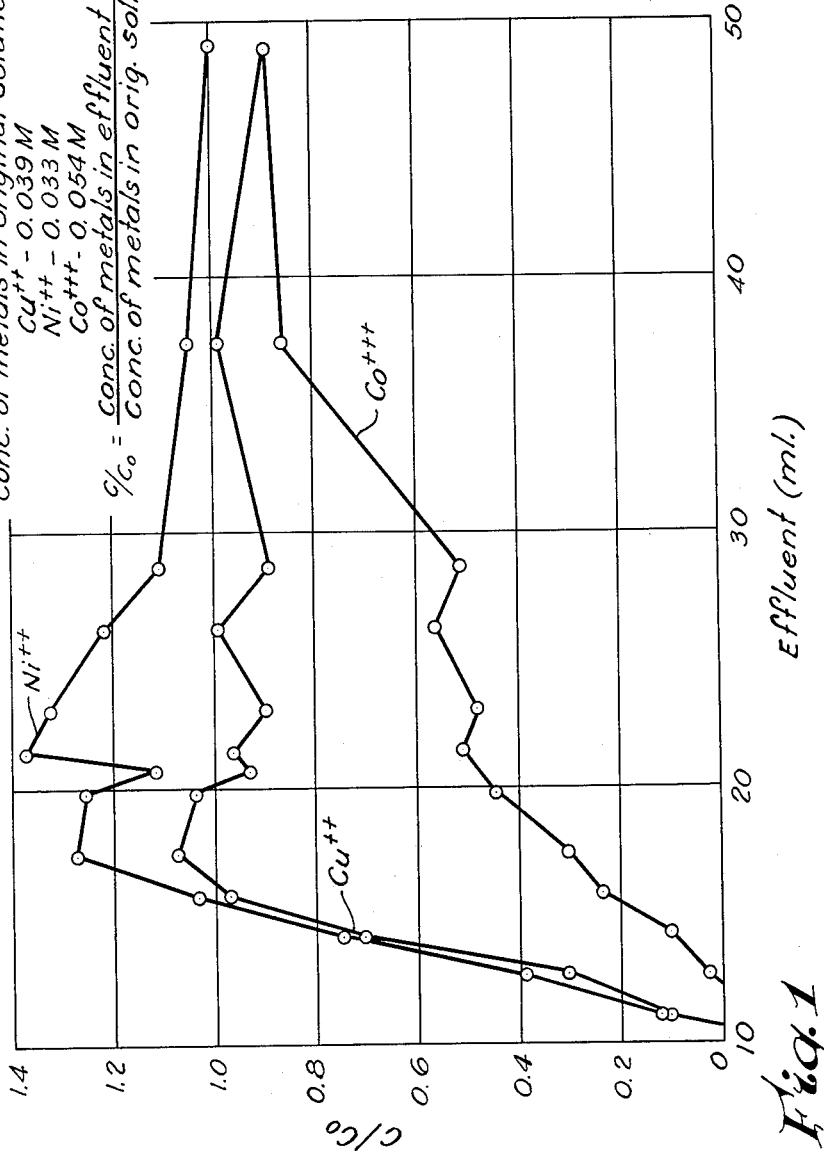

INVENTOR.
Joseph H. Howe

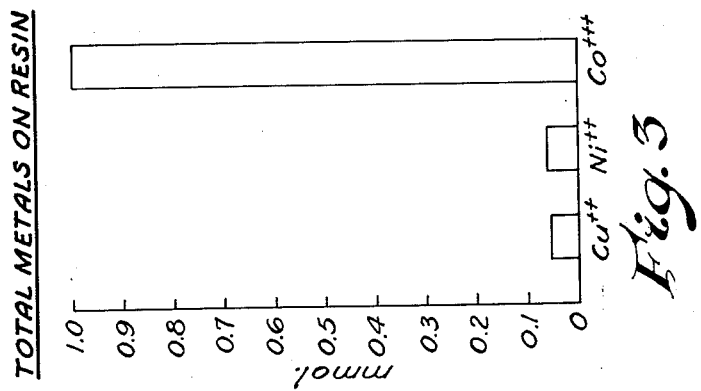
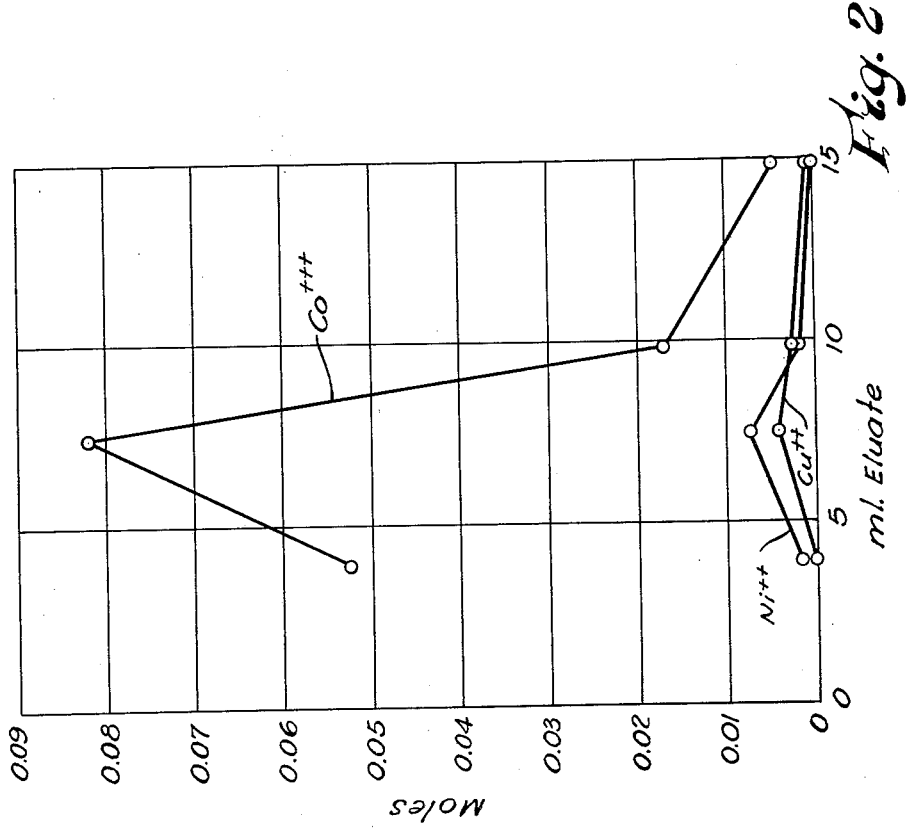
INVENTOR.
Joseph H. Howe
BY
Theodore Post
ATTORNEY

3,047,547
THIOKETO ACID CONTAINING A VINYLPHENYL SUBSTITUENT AND POLYMERIC PRODUCTS THEREOF

Joseph H. Howe, Freeland, Mich., assignor to The Dow Chemical Company, Midland, Mich., a corporation of Delaware
Filed May 5, 1960, Ser. No. 27,120
5 Claims. (Cl. 260—79.7)

This invention concerns 2-thioketo-3-(ar-vinylphenyl)-propionic acid, its resinous polymeric products and their preparation.

The chelating activity of certain thioketo compounds is known. However, no such compound is known which contains an unsaturated polymerizable group whereby it can be polymerized to water-insoluble resinous polymeric form or can be combined in water-insoluble resinous polymeric form with other resin-forming monomers to give products useful in chelating or complexing metal ions.

The compound 2-thioketo-3-(ar-vinylphenyl)propionic acid, hereinafter referred to as 2TK3VPPA, is prepared by reacting at 80°–85° C. ar-vinylbenzaldehyde, either ortho or para or mixtures thereof, with an equimolar amount of rhodanine dissolved in glacial acetic acid in the presence of up to a twice molar proportion of sodium acetate as a condensation catalyst and a polymerization inhibiting amount of a conventional phenolic, amine or quinone polymerization inhibitor, for a time sufficient to give orange crystals of intermediate ar-vinylbenzalrhodanine upon cooling the reaction mixture. A simple test suffices to determine the reaction time, which approximates one hour or less. The intermediate ar-vinylbenzalrhodanine is filtered off, washed with ice water in which it is slightly soluble and recrystallized from ethanol. It is then hydrolyzed, advantageously by heating at 40°–60° C. with aqueous 15 percent sodium hydroxide or equivalent in the presence of a polymerization inhibitor for a time sufficient (generally ca. ½–1 hour) to give maximum precipitation when cooled and acidified with dilute mineral acid, which precipitates product 2TK3VPPA. A simple trial run suffices to determine this time. Excess heating is to be avoided, since it promotes oxidation and polymerization.

The reactions involved may be represented as follows:

CH₂:CH—C₆H₄—CHO + H₂C—S—C(:S)NH—C:O ⟶

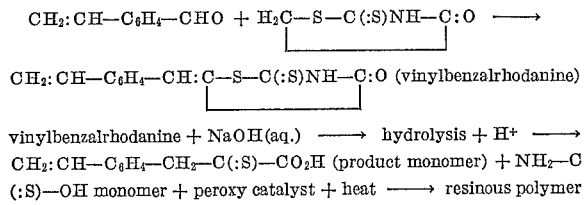

vinylbenzalrhodanine + NaOH(aq.) ⟶ hydrolysis + H⁺ ⟶
CH₂:CH—C₆H₄—CH₂—C(:S)—CO₂H (product monomer) + NH₂—C(:S)—OH monomer + peroxy catalyst + heat ⟶ resinous polymer Resinous polymeric 2TK3VPPA is prepared by heating the monomer per se or together with one or more monoethylenic or diethylenic unsaturated monomers of the type which are copolymerizable with styrene, e.g., vinyltoluene, vinylxylene, ar-dichlorostyrene, acrylate and methacrylate esters, divinylbenzene and styrene itself, using a conventional catalyst such as is used with styrene-type polymerizations, e.g., peroxy catalysts such as ditertiarylbutyl peroxide, cumene hydroperoxide, benzoyl peroxide, alkali metal persulfates, azo catalysts such as azo-bis-isobutyronitrile, etc. at a temperature up to about 100° C. for a time sufficient to give a resinous polymeric product.

The 2TK3VPPA and its resinous polymeric products in the enol form are useful in chelating or complexing metals at an alkaline pH. The metals are thereafter removed by elution with mineral acid, and the resin is thereby regenerated.

The following non-limitative examples describe completely specific embodiments and set forth the best mode contemplated by the inventor for carrying out the invention claimed.

Example 1

A quantity of 26.6 grams (0.2 mole) ar-vinylbenzaldehyde, 26.6 grams (0.2 mole) rhodanine, 30 grams (0.37 mole) sodium acetate and 15 mg. naphthoquinone polymerization inhibitor in a solvent of 160 ml. of glacial acetic acid was heated on the steam bath at 80°–85° C. with occasional stirring. The sodium acetate dissolved slowly upon heating. After ten minutes' reaction time, a clear orange solution formed. Yellow needle-like crystals formed as the reaction proceeded. The reaction was continued for a total of 1¼ hours. Upon cooling overnight, a semi-solid mass of orange crystals formed. This product, ar-vinylbenzalrhodanine, was washed with ice water, during which a small amount dissolved. The washed product was recrystallized from 1.2–1.5 liters of ethanol to give a yellow flocculent product. Filtration and drying gave 9.9 grams of ar-vinylbenzalrhodanine product,

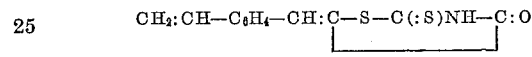

Further concentration of the ethanol mother liquor gave 14.1 grams of additional product. The total crude product yield was 76 percent.

*Analysis.*—Calculated for $C_{12}H_9ONS_2$: percent sulfur, 25.8; percent N, 5.64; unsaturation, 100. Found: percent S, 25.33 (peroxide fusion-barium sulfate method); percent N, 5.02; unsaturation (bromate-bromide method), 88.9. Melting point in preheated bath, 203°–206° C., with decomposition.

A quantity of 8 grams of the ar-vinylbenzalrhodanine was heated on the steam bath with a solution of 6 grams of sodium hydroxide in 40 ml. of water and a trace of naphthoquinone polymerization inhibitor with occasional stirring. In the range of 40°–60° C., the ar-vinylbenzalrhodanine dissolved to give a clear red solution. After about 10 minutes of continued heating, the reaction solution became cloudy then clear again. After a total of 30 minutes' heating time, the reaction mixture was cooled. Addition of dilute hydrochloric acid (ca. one normal) gave 6.9 grams of an off-white precipitate of 2TK3VPPA, CH₂:CH—C₆H₄—CH₂—C(:S)—CO₂H, in high yield.

*Analysis.*—Calculated for $C_{11}H_{10}O_2S$: percent C, 64; percent H, 4.85; percent S, 15.5; unsaturation, 100; neutralization equivalent, 206. Found (product recrystallized from ethanol); percent S, 14.04; percent C, 56.74; percent hydrogen, 4.32; molecular weight, cryoscopic method in benzene, 239; unsaturation (bromate-bromide method), 84.6.

Example 2

A two gram sample of 2TK3VPPA was dissolved in 4 ml. of dioxane along with 0.01 gram azo-bis-isobutyronitrile. The reaction solution was refluxed for 4 days. A yellow precipitate, resinous polymeric 2TK3VPPA, formed slowly during this period. The precipitate was separated by filtration and dried to give 1.0 gram of a brittle yellow polymer (fraction 1), useful for chelating copper and nickel. The dioxane filtrate was then diluted with 40–50 percent water to give a sticky, fibrous, polymeric material which hardened upon standing. Drying gave 0.4 gram of product (fraction 2), also useful for chelating copper and nickel. The polymer structure was substantiated by sulfur and infrared analysis. However, analysis did indicate a 6 percent decrease in sulfur content in the polymer as compared with the monomer.

This appears to indicate some decomposition after prolonged heating. Analytic data follow.

|  | Percent S | Purity Percent |
|---|---|---|
| 2TK3VPPA | 14.04 | 91 |
| Fraction 1 | 11.3 | 73 |
| Fraction 2 | 12.9 | 83 |

A two gram sample of 2TK3VPPA was dissolved in 6 ml. of distilled dioxane along with 0.01 percent azo-bis-isobutyronitrile catalyst and 0.08 gram commercial (50 percent) divinylbenzene. The mixture was heated at reflux for 7 days. A yellow granular precipitate, resinous polymeric 2TK3VPPA, formed slowly during this period. The mixture was filtered and washed several times with acetone and the acetone extract was evaporated to dryness to give 0.69 gram of acetone-soluble polymer, useful for chelating copper and nickel. The acetone-insoluble polymer was washed several times with hot aqueous 5 percent sodium hydroxide. Adjustment of the pH of the combined aqueous sodium hydroxide extracts to pH 2–3 gave a yellow flocculent precipitate. The precipitate was filtered and dried to give 0.37 gram of light yellow polymer, useful for chelating copper and nickel. The hydroxide-insoluble portion was vacuum dried to give 0.88 gram of ground granular polymer.

Example 3

A small amount of the hydroxide-insoluble polymer of Example 2 was washed with water, and a large excess of an ammoniacal solution of $Cu^{++}$ and $Ni^{++}$ in a ratio of 9:1 was added thereto. The polymer became blue-green in color quickly and darkened considerably after ½ hour. The resin was then eluted with ca. one molar hydrochloric acid. Analysis of the eluate indicated a capacity of 2.24 mole of divalent metal ions per gram of resin.

Example 4

A metal liquor containing

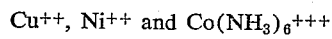
$Cu^{++}$, $Ni^{++}$ and $Co(NH_3)_6^{+++}$ was made by dissolving the following amounts of metal salts in 500 ml. of one M ammonium hydroxide:

4.17 g. $CuSO_4 \cdot 5H_2O$
4.39 g. $NiSO_4 \cdot 6H_2O$
10.15 g. $((Co(NH_3)_6^{+++}))_2(SO_4)_3$ Polarographic analysis indicated the solution was 0.039 M in $Cu^{++}$, 0.033 M in $Ni^{++}$ and 0.054 M in $Co(NH_3)_6^{+++}$. A sample of 0.62 gram of water-insoluble resinous polymeric 2TK3VPPA (2 percent divinylbenzene copolymer) was packed in a 10 ml. column equilibrated with one M ammonium hydroxide. Total resin volume was 4.7 ml. The above described metal liquor was passed through the column at a flow rate of 4–15 drops per minute. Approximately one ml. cuts of the effluent were collected and analyzed. For results, see accompanying FIGURE 1. A total of 41 tubes was collected, but with tubes 38–41 containing 10–15 ml. of eluate. The resin column was then washed thoroughly with one M ammonium hydroxide until the eluate was essentially clear, after which the resin was eluted with 2 M hydrochloric acid and cuts of the eluate were analyzed. See accompanying FIGURES 2 and 3 for results.

What is claimed is:

1. As a new compound, 2-thioketo-3-(ar-vinylphenyl)-propionic acid.

2. Method for making ar-vinylbenzalrhodanine by heating equimolar proportions of ar-vinylbenzaldehyde and rhodanine at 80°–85° C. in solution in glacial acetic acid containing sodium acetate in catalytic amount up to two molar proportions per mole of vinylbenzaldehyde and in the presence of a polymerization inhibitor for a time sufficient to form a yellow to orange acicular crystalline product.

3. Method for making 2-thioketo-3-(ar-vinylphenyl)-propionic acid by heating and hydrolyzing ar-vinylbenzalrhodanine in aqueous alkaline solution at about 40°–60° C. in the presence of a polymerization inhibitor for a time sufficient to give maximum precipitation when cooled and acidified with dilute mineral acid and thereafter acidifying the reaction medium with dilute mineral acid to precipitate 2-thioketo-3-(ar-vinylphenyl)-propionic acid product.

4. A resinous copolymer of 2 weight percent divinylbenzene, the balance being combined 2-thioketo-3-(ar-vinylphenyl)propionic caid.

5. A resinous polymeric 2-thioketo-3-(ar-vinylphenyl)-propionic acid of the group consisting of its homopolymers and copolymers with an ethylenically unsaturated monomer of the group consisting of styrene and ethylenically unsaturated monomers copolymerizable with styrene.

References Cited in the file of this patent
UNITED STATES PATENTS
2,940,992    Zaugg _____ June 14, 1960